(No Model.)

C. KOCH & C. BIEL.
GARDEN HOE.

No. 422,783. Patented Mar. 4, 1890.

Witnesses.
U.W. Chamberlin
A. W. Woods

Inventors.
Charles Koch and Christ Biel
Per. Artemas Roberts
Attorney.

UNITED STATES PATENT OFFICE.

CHARLES KOCH AND CHRIST BIEL, OF GERMANTOWN, NEBRASKA.

GARDEN-HOE.

SPECIFICATION forming part of Letters Patent No. 422,783, dated March 4, 1890.

Application filed May 28, 1889. Serial No. 312,482. (No model.)

*To all whom it may concern:*

Be it known that we, CHARLES KOCH and CHRIST BIEL, citizens of the United States, residing at Germantown, in the county of Seward and State of Nebraska, have invented certain new and useful Improvements in Garden-Hoes; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Our invention relates to reversible weeding-hoes; and it consists in the improved construction hereinafter described and set forth, whereby a simple and efficient arrangement is provided.

Figure 1:
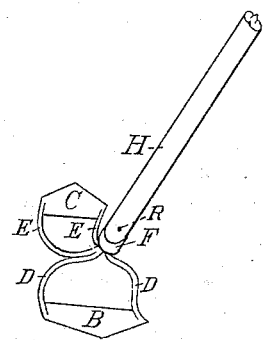
Figure 2:
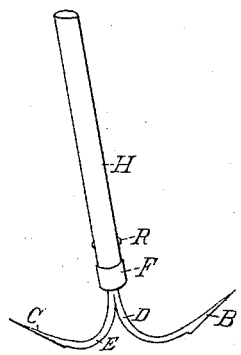

In the accompanying drawings, forming part of this specification, Figure 1 is a perspective view of an implement embodying our improvement, and Fig. 2 is a side view of the same.

The primary object of our improvement is to combine in a single implement two distinct and correspondingly-shaped hoe-blades of different widths and formed with distinct partial shanks reversed relative to each other, so that the implement may be used either for ordinary service or for working between closely-arranged plants and yet avoid the clogging and interference that ensue in cases where a single blade having two hoe-edges of different widths has been employed.

As represented, the device consists of two distinct hoes, one of greater size than the other, the larger hoe consisting of a steel blade portion C, to which iron arms D D are welded, the said arms being composed of a bifurcated or spread portion merging into a single piece, which in turn is united with a corresponding piece of the smaller hoe. This latter, although of smaller dimension, is composed of a steel blade C, having the iron arms E E welded thereto, these latter merging into a single piece and connected with the similar portion of the other hoe, as previously stated. It will be noted that each hoe-blade is of such relative size and is so connected with its arms that no dirt or earth can lodge thereon, but will pass therefrom through the opening presented by the arms and the inner edge of said blade, thereby scouring and maintaining the surface clear of the latter. Inasmuch as the merged portions of each pair of arms are united in a single piece, the latter can be readily united in a handle H and secured therein by means of a rivet R and ferrule F. The working-edge of each blade is formed of an obtuse angle, as shown, to enable the hoe to more freely enter the earth.

We claim—

The combination, in a garden implement, of a handle, separated arms D D and E E, diverging relative to each other and united at their tangs to form a shank seated and secured in the handle, and different-sized blades secured between said arms to leave spaces between their inner edges and said arms, and having their lower edges converging toward a central point, substantially as set forth.

CHARLES KOCH.
CHRIST BIEL.

Witnesses:
R. F. SEEMANN,
HER. MUENCHAU.